(12) United States Patent
Iyer et al.

(10) Patent No.: US 11,014,999 B2
(45) Date of Patent: May 25, 2021

(54) SYSTEMS AND METHODS FOR PROCESSING FLUOROPOLYMER MATERIALS AND RELATED WORKPIECES

(71) Applicant: Inhance Technologies, LLC, Houston, TX (US)

(72) Inventors: Subramanian Iyer, Katy, TX (US); Andrew M. Thompson, West Chester, PA (US); Adrian R. Samaniego, Cypress, TX (US)

(73) Assignee: Inhance Technologies, LLC, Houston, TX (US)

( * ) Notice: Subject to any disclaimer, the term of this patent is extended or adjusted under 35 U.S.C. 154(b) by 60 days.

(21) Appl. No.: 16/381,328

(22) Filed: Apr. 11, 2019

(65) Prior Publication Data

US 2019/0322778 A1 Oct. 24, 2019

Related U.S. Application Data

(60) Provisional application No. 62/661,743, filed on Apr. 24, 2018.

(51) Int. Cl.
| | | |
|---|---|---|
| *C08F 114/26* | (2006.01) | |
| *B01J 8/00* | (2006.01) | |
| *B01J 8/02* | (2006.01) | |
| *C08F 6/28* | (2006.01) | |

(52) U.S. Cl.
CPC ............ *C08F 114/26* (2013.01); *B01J 8/001* (2013.01); *B01J 8/0278* (2013.01); *C08F 6/28* (2013.01); *B01J 2208/00548* (2013.01)

(58) Field of Classification Search
None
See application file for complete search history.

(56) References Cited

U.S. PATENT DOCUMENTS

| | | | | |
|---|---|---|---|---|
| 2,559,752 A | * | 7/1951 | Berry | C08F 2/16 |
| | | | | 524/723 |
| 4,626,587 A | * | 12/1986 | Morgan | B29C 48/92 |
| | | | | 528/481 |
| 4,743,658 A | * | 5/1988 | Imbalzano | B29B 9/16 |
| | | | | 264/83 |

(Continued)

FOREIGN PATENT DOCUMENTS

| | | | | |
|---|---|---|---|---|
| CN | 102066307 A | * | 5/2011 | ............ C07C 51/44 |
| CN | 107177145 A | * | 9/2017 | |
| GB | 1210794 A | * | 10/1970 | ............ C08J 5/2293 |

OTHER PUBLICATIONS

Jun. 14, 2019, International Search Report issued in International Application No. PCT/US2019/027587.

(Continued)

*Primary Examiner* — Nicole M. Buie-Hatcher
(74) *Attorney, Agent, or Firm* — Clements Bernard Walker; Jennifer R. Knight

(57) ABSTRACT

A method for removing perfluorinated compounds from a fluoropolymer material is provided. The method includes the steps of: (a) providing the fluoropolymer material in a chamber; (b) providing an anaerobic environment in the chamber; and (c) providing a fluorination gas in the chamber, thereby exposing the fluoropolymer material to the fluorination gas. The method results in the removal the perfluorinated compounds from the fluoropolymer material.

19 Claims, 9 Drawing Sheets

(56) References Cited

U.S. PATENT DOCUMENTS

| | | | |
|---|---|---|---|
| 4,908,415 A | 3/1990 | Aramaki et al. | |
| 2002/0013419 A1* | 1/2002 | Blong | C08F 6/22 |
| | | | 525/326.4 |
| 2003/0125400 A1* | 7/2003 | Komori | C08J 11/06 |
| | | | 521/40.5 |
| 2005/0189299 A1 | 9/2005 | Malvasi et al. | |
| 2005/0240067 A1 | 10/2005 | Bauer et al. | |
| 2013/0303701 A1* | 11/2013 | Brothers | C08F 8/22 |
| | | | 525/200 |
| 2013/0303707 A1* | 11/2013 | Brothers | B29C 48/76 |
| | | | 525/356 |
| 2013/0303718 A1* | 11/2013 | Brothers | B01J 21/063 |
| | | | 526/255 |

OTHER PUBLICATIONS

EU Regulatory Compliant PTFE Additives for Coatings & Inks, Shamrock Technologies, Inc., 2020 [retrieved on Dec. 1, 2020]. Retrieved from the Internet <https://shamrocktechnologies.com/regulatory-compliant-ptfe/>.

PTFE Micropowders, Shamrock Technologies, Inc., 2017 [retrieved on Nov. 30, 2020]. Retrieved from the Internet <https://shamrocktechnologies.com/products/ptfe-micropowders/>.

* cited by examiner

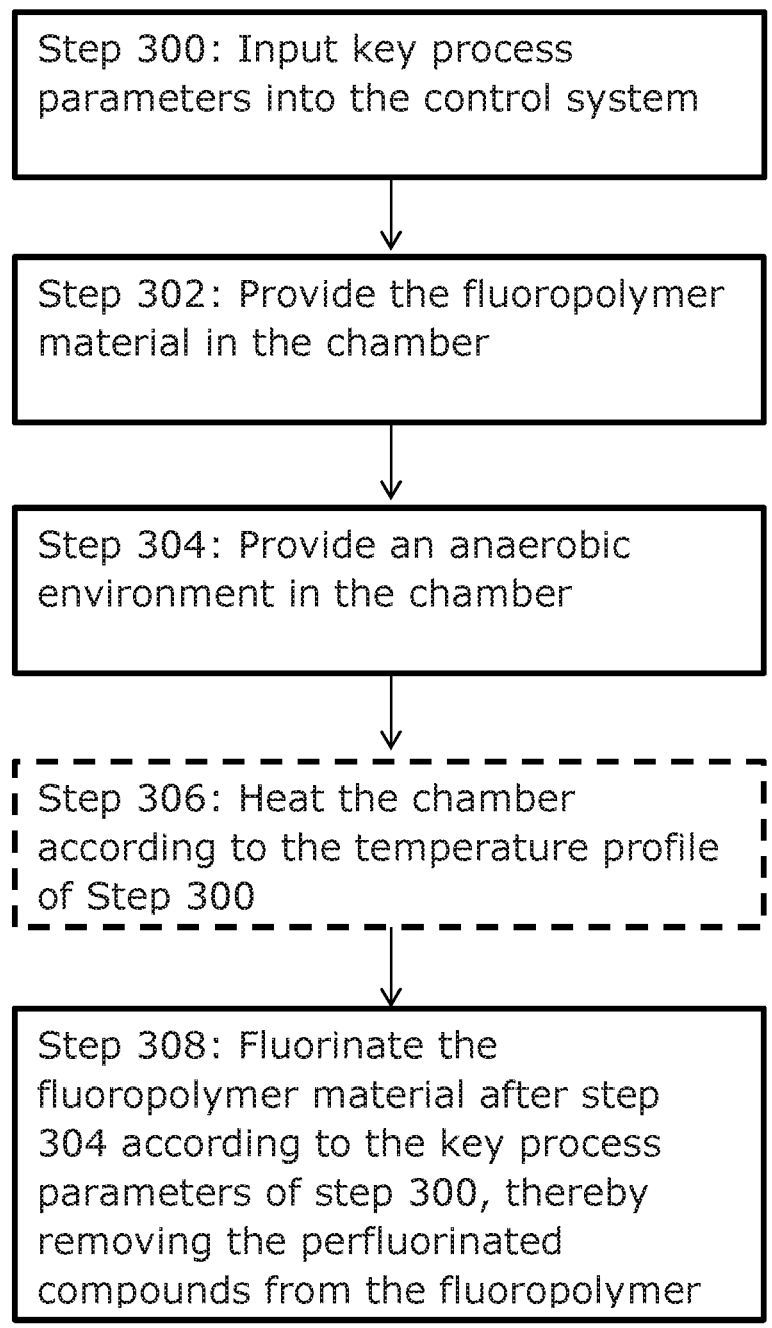

SYSTEMS AND METHODS FOR PROCESSING FLUOROPOLYMER MATERIALS AND RELATED WORKPIECES

CROSS-REFERENCE

This application claims priority under 35 U.S.C, 119(e) to U.S. Provisional Application Ser. No. 62/661,743 file on Apr. 24, 2018, which is incorporated herein by reference in its entirety.

FIELD

The invention relates to systems and methods for processing fluoropolymer materials, and more particularly, to improved systems and methods for removing perfluorinated compounds from fluoropolymer materials.

BACKGROUND

Fluoropolymers (e.g., polytetrafluoroethylene, that is, PTFE) are widely used in many applications such as, for example, inks, coatings, cosmetics, industrial applications, among others. Such fluoropolymers are often utilized for their non-stick and/or friction reducing properties.

Many fluoropolymers (e.g., PTFE) include perfluorinated compounds (PFCs), such as perfluorinated acids. Exemplary perfluorinated compounds are C4-C8 surfactants. Another term for these chemicals is perfluoroalkyl substances (PFASs). Examples of PFCs/PFASs that are C8 surfactants include perfluorooctanoic acid (PFOA) and perfluorooctanesulfonic acid (PFOS). Examples of PFCs/PFASs that are C6 surfactants include perfluorohexanoic acid (PFHxA) and perfluorohexane sulfonic acid (PFHxS).

PFOA and other similar perfluorinated compounds are considered to be toxicants and/or carcinogens and tend to have a long life. Referring specifically to PFOA, exemplary health issues may include kidney cancer, testicular cancer, ulcerative colitis, thyroid disease, and hypertension. PFOA and similar perfluorinated compounds often are very resistant to biodegradation and have the potential to bioaccumulate.

For example, such perfluorinated compounds may be used for the manufacture of certain fluoropolymers and could also form during the manufacture of certain fluoropolymers, and/or in connection with the degradation of certain fluoropolymers, etc. PFCs/PFASs may be generated during the process for making PTFE micropowders. Also, PFCs/PFASs may be generated in recycled resin material due to the additional processing and degradation of the fluoropolymer.

Thus, it would be desirable to address the issues of perfluorinated compounds in fluoropolymers.

SUMMARY

According to an exemplary embodiment of the invention, a method of removing perfluorinated compounds in a fluoropolymer material is provided. The method includes the steps of: (a) providing a fluoropolymer material in a chamber; (b) providing an anaerobic environment in the chamber; and (c) providing a fluorination gas in the chamber after step (b), thereby exposing the fluoropolymer material to the fluorination gas to produce a processed fluoropolymer material. An amount of the perfluorinated compounds in the processed fluoropolymer material is lower than an amount of the perfluorinated compounds in the fluoropolymer material.

According to another exemplary embodiment of the invention, a method of removing perfluorinated compounds in a fluoropolymer material is provided. The method includes the steps of: (a) providing a fluoropolymer material in a chamber; (b) providing an anaerobic environment in the chamber; (c) providing a fluorination gas in the chamber after step (b), thereby exposing the fluoropolymer material to the fluorination gas to produce a processed fluoropolymer material; (d) withdrawing the fluorination gas from the chamber; and (e) withdrawing the processed fluoropolymer from the chamber. The fluorination gas is continuously fed to the chamber during step (c). An amount of the perfluorinated compounds in the processed fluoropolymer material is less than 10 ppb.

According to another exemplary embodiment of the invention, a system for removing perfluorinated compounds in a fluoropolymer material is provided. The system includes a chamber for housing the fluoropolymer material. The chamber is provided with an anaerobic environment during at least a portion of a processing cycle. The system includes a fluorination gas source for fluorinating the chamber during at least a portion of the processing cycle. The system also includes a control system for controlling flow of the fluorination gas entering and/or leaving the chamber. At least a portion of the perfluorinated compounds are removed from the fluoropolymer material.

According to yet another exemplary embodiment of the invention, a system for removing perfluorinated compounds in a fluoropolymer material is provided. The system includes a chamber for housing the fluoropolymer material. The chamber is provided with an anaerobic environment during at least a portion of a processing cycle. The system includes a fluorination gas source for fluorinating the chamber during at least a portion of the processing cycle. The system also includes a control system for controlling flow of the fluorination gas entering and/or leaving the chamber. At least a portion of the perfluorinated compounds are removed from the fluoropolymer material to a concentration of less than 10 ppb.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures:

FIG. 3 is a flow diagram illustrating a method of processing a fluoropolymer material to remove a perfluorinated compounds from the fluoropolymer material in accordance with an exemplary embodiment of the invention.

DETAILED DESCRIPTION

Figure 1A:
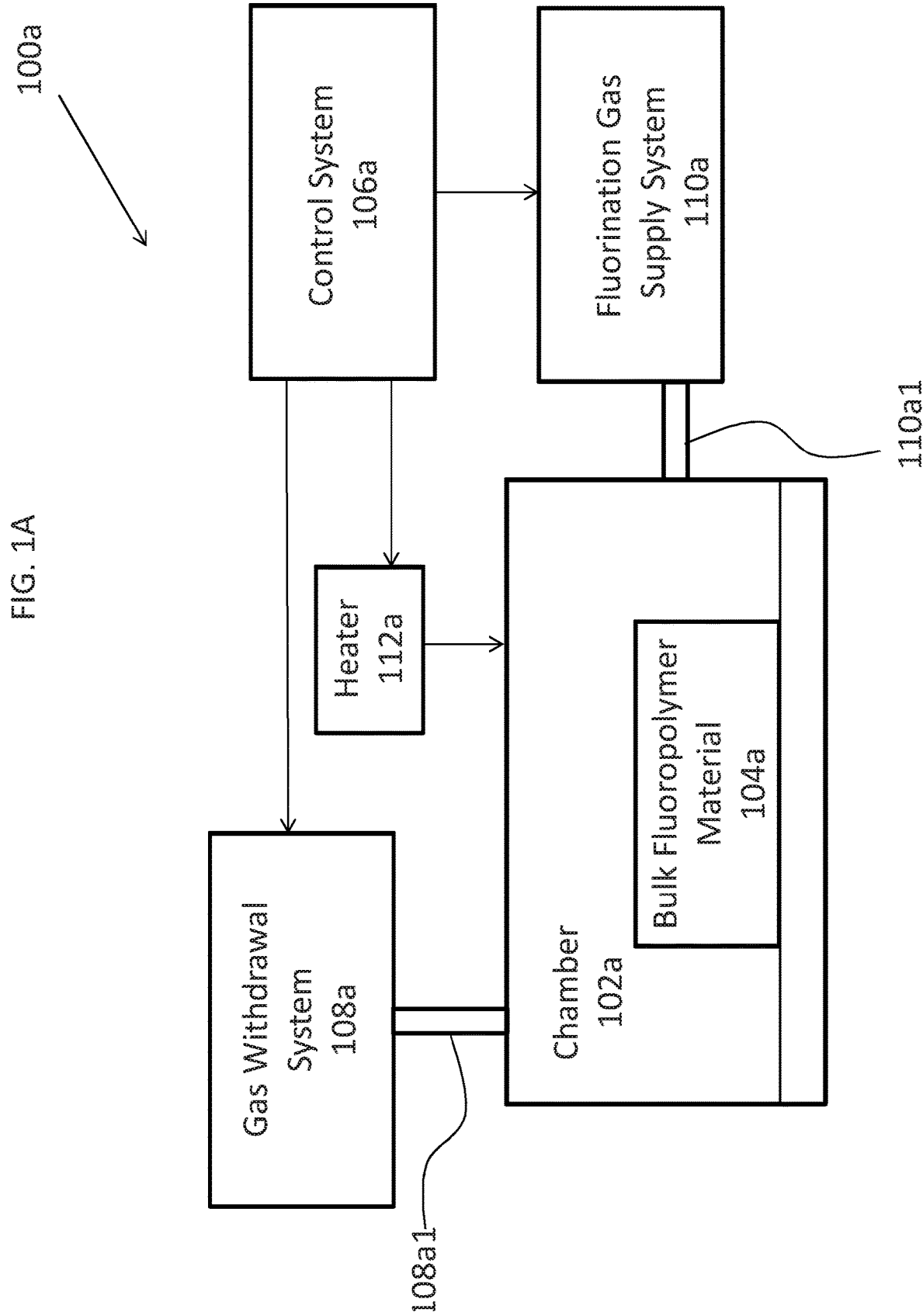
FIGS. 1A-1D are a plurality of block diagrams illustrating systems for processing a fluoropolymer material, in accordance with various exemplary embodiments of the invention.

The present invention provides in an exemplary embodiment, a method of removing perfluorinated compounds in a fluoropolymer material. The method includes the steps of: (a) providing a fluoropolymer material in a chamber; (b) providing an anaerobic environment in the chamber; and (c) providing a fluorination gas in the chamber after step (b), thereby exposing the fluoropolymer material to the fluorination gas to produce a processed fluoropolymer material. An amount of the perfluorinated compounds in the processed fluoropolymer material is lower than an amount of the perfluorinated compounds in the fluoropolymer material.

It is to be understood that the mention of one or more method steps does not preclude the presence of additional method steps before or after the combined recited steps or intervening method steps between those steps expressly identified. Moreover, the lettering of method steps or ingredients is a conventional means for identifying discrete activities or ingredients and the recited lettering can be arranged in any sequence, unless otherwise indicated.

As used herein, the term "and/or", when used in a list of two or more items, means that any one of the listed items can be employed by itself, or any combination or two or more of the listed items can be employed. For example, if a composition is described as containing compounds A, B, "and/or" C, the composition may contain A alone; B alone; C alone; A and B in combination; A and C in combination; B and C in combination; or A, B, and C in combination.

As used herein, the term "anaerobic environment", refers to an environment wherein free oxygen is substantially absent. For the purposes of the present invention, where free oxygen competes with the desired reactions, an "anaerobic environment" comprises less than 100 ppm free oxygen unless a smaller amount of free oxygen is specified.

As used herein, the term "fluorination gas" refers to a gas comprising fluorine, chlorine trifluoride, and/or nitrogen trifluoride. The "fluorination gas" may also contain inert elements and/or compounds.

As used herein, the terms "fluoropolymer material" and "fluoropolymer" refer to a fluorocarbon-based molecule with multiple carbon-fluorine bonds. It is characterized by a high level of chemical resistance. The terms "fluoropolymer material" and "fluoropolymer" include fluoropolymers, fluoroelastomers, and fluororubbers. The most well-known fluoropolymer is polytetrafluoroethylene (PTFE).

As used herein, the term "perfluorinated compounds" and "perfluoroalkyl substances" refer to C4 to C20 perfluorocarbons and/or perfluoroethers with a functional end group. Non-limiting examples of the functional end group include carboxylic acids, sulfonic acids, and ammonium salts.

As used herein, the terms "remove", "removed", "removing", and similar words, with respect to a perfluorinated compounds (e.g., PFOA, PFOS, etc.) are intended to refer to both a physical desorption of the perfluorinated compounds and a chemical alteration of the underlying fluoropolymer material such that the amount of the perfluorinated compounds in the underlying material has been reduced as indicated by a detection system. That is, the chemical composition of the underlying fluoropolymer material may be changed to reduce the concentration of the perfluorinated compounds in the underlying fluoropolymer material.

The present embodiment comprises providing a fluoropolymer material in a chamber. The fluoropolymer material may be provided in any of a number of forms. For example, the fluoropolymer material may be provided as a bulk material (e.g., pellets, a powder, shredded material, sheet material, film material, string, a recycled or reclaimed fluoropolymer polymer, etc.). In other examples, the fluoropolymer material may be included as part of a workpiece (e.g., a fluoropolymer coating applied to a workpiece such as cookware). Non-limiting examples of the workpiece may include the fluoropolymer material as a component or formulation ingredient of an ink, a coating, a lubricant, a grease, a cosmetic, an industrial part, a filler for polymers for wear enhancement or friction reduction, a medical part, a wiring or cable component (e.g., for aerospace applications, for computer applications), a bearing, a gear, a slide plate, a composite component, a hose assembly, an expansion joint (e.g., in industrial pipes, seals, etc.), an electronics component, etc. In one aspect, the fluoropolymer material is a fluoropolymer. In one aspect, the fluoropolymer material is a fluoroelastomer. In one aspect, the fluoropolymer material is a fluororubber. In one aspect, the fluoropolymer material comprises polytetrafluoroethylene (PTFE). The exemplary methods of, and systems for, processing fluoropolymer materials described herein may be applied to virgin fluoropolymer materials (e.g., newly manufactured PTFE that has not been used) or recycled fluoropolymer materials (e.g., recycled PTFE that has been reground, etc.).

Removing perfluorinated compounds in an existing fluoropolymer material (whether provided as a bulk material, as a part of a workpiece such as a coating on the workpiece, etc.) according to the invention is in contrast to making changes to the original manufacturing process of a fluoropolymer material to impact the concentration of perfluorinated compounds.

The chamber refers to at least one piece of process equipment which can contain the fluoropolymer material and the fluorination gas and exclude atmospheric gases at the process conditions.

The present embodiment includes providing and anaerobic environment in the chamber. In one aspect, the anaerobic environment in the chamber comprises less than 100 ppm of free oxygen. Other examples of the amount of free oxygen include less than 50 ppm, less than 10 ppm, and less than 1 ppm of free oxygen. The process for providing the anaerobic environment is not particularly limited, and many are known by those skilled in the art. For example, the free oxygen can be removed from the chamber by applying vacuum to the chamber to pull the free oxygen out of the chamber. In another example, the free oxygen can be displaced in the chamber by feeding an inert gas into the chamber while simultaneously allowing gas from within the chamber to exit the chamber.

The present embodiment includes providing a fluorination gas in the chamber. In one aspect, the fluorination gas comprises fluorine in range of 1-100% by volume (e.g., the fluorination gas being pure fluorine, the fluorination gas being a gas mixture including fluorine mixed with at least one additional gas such as nitrogen, carbon dioxide, and/or argon). In one aspect, the fluorination gas comprises 5 vol % to 95 vol % fluorine, 10 vol % to 90 vol % fluorine, or 20 vol % to 75 vol % fluorine. In one aspect, the fluorination gas comprises 99 vol % to 0 vol % of an inert gas. Other non-limiting examples include 95 vol % to 5 vol %; 90 vol % to 10 vol %; and 80 vol % to 25 vol % of inert gas. In one aspect, the fluorination gas comprises fluorine, chlorine trifluoride, and/or nitrogen trifluoride, and the fluorination gas comprises 5 vol % to 95 vol % fluorine equivalents, 10 vol % to 90 vol % fluorine equivalents, or 20 vol % to 75 vol % fluorine equivalents. In one aspect, the fluorination gas comprises 99 vol % to 0 vol % of an inert gas, and the inert gas comprises nitrogen. In one aspect, the fluorination gas comprises less than 100 ppm of free oxygen. Other non-limiting examples of the amount of free oxygen in the fluorination gas include, less than 50 ppm, less than 10 ppm, less than 5 ppm, and less than 1 ppm free oxygen.

The present embodiment includes providing a fluorination gas in the chamber, thereby exposing the fluoropolymer material to the fluorination gas to produce a processed fluoropolymer material. The exposure of the fluorination gas to the fluoropolymer results in the removal of perfluorinated compounds. A specific example of the fluoropolymer material may be PTFE material, and an exemplary perfluorinated compound to be removed from the PTFE material is perfluorooctanoic acid (PFOA). Other exemplary perfluorinated compounds to be removed from the fluoropolymer material include perfluorooctanesulfonic acid (PFOS), perfluorohexanoic acid (PFHxA), and perfluorohexane sulfonic acid (PFHxS). In one aspect, the perfluorinated compounds removed from the fluoropolymer material comprise perfluorooctanoic acid.

In one aspect, the method further includes the steps of (d) withdrawing the fluorination gas from the chamber; and (e) withdrawing the processed fluoropolymer material from the chamber. The method for withdrawing the fluorination gas from the chamber is not particularly limited. In one aspect the fluorination gas is removed from the chamber by applying vacuum to the chamber to pull the fluorination gas out of the chamber. In one aspect, the fluorination gas is displaced in the chamber by feeding a different gas into the chamber while simultaneously allowing gas from within the chamber to exit the chamber.

In accordance with the present embodiment, an amount of the perfluorinated compounds in the processed fluoropolymer material is lower than an amount of the perfluorinated compounds in the fluoropolymer material. Exemplary ranges for the perfluorinated compounds in the processed fluoropolymer material include: less than 5,000 parts per billion (ppb) of the perfluorinated compounds, less than 300 ppb of the perfluorinated compounds, less than 100 ppb of the perfluorinated compounds, less than 50 ppb of the perfluorinated compounds, less than 10 ppb of the perfluorinated compounds, less than 1,000 parts per trillion (ppt) of the perfluorinated compounds, less than 100 ppt of the perfluorinated compounds, less than 50 ppt of the perfluorinated compounds, less than 10 ppt of the perfluorinated compounds, less than 1 ppt of the perfluorinated compounds, and less than 0.5 ppt of the perfluorinated compounds. In one aspect, the perfluorinated compounds are non-detectable in the processed fluoropolymer material.

In one aspect, the method for removing perfluorinated compounds further comprises the step of heating the chamber to a temperature in the range of 25° C. to 325° C. In other words, heat is applied to part of the chamber and/or the fluorination gas such that a temperature measurement within the chamber is 25° C. to 325° C. Other non-limiting examples of chamber temperature ranges are 25° C. to 300° C., 25° C. to 275° C., 25° C. to 250° C., 50° C. to 300° C., 50° C. to 275° C., 50° C. to 250° C., 50° C. to 200° C., 75° C. to 300° C., 75° C. to 275° C., 100° C. to 275° C., and 150° C. to 250° C.

One skilled in the art recognizes that the time period wherein the fluoropolymer material is exposed to the fluorination gas may influence the concentration of perfluorinated compounds in the processed fluoropolymer material. In one aspect, the fluoropolymer material is expose to the fluorination gas for a time period in a range of 1 hour to 1000 hours. Other non-limiting examples include the fluoropolymer material being exposed to the fluorination gas for a time period in a range of 1 hour to 500 hours, 1 hour to 200 hours, 1 hour to 72 hours, 1 hour to 48 hours, 1 hour to 24 hours, 1 hour to 8 hours, 1 hour to 6 hours, 1 hour to 4 hours, 1 hour to 2 hours, 2 hours to 200 hours, 2 hours to 100 hours, 2 hours to 72 hours, 2 hours to 24 hours, 2 hours to 8 hours, 2 hours to 6 hours, 2 hours to 4 hours, and 3 hours to 50 hours.

In one aspect the method for removing perfluorinated compounds in a fluoropolymer material, the fluoropolymer material is exposed to the fluorination gas at a chamber pressure range from 5 PSIA to 55 PSIA. Other non-limiting examples of the chamber pressure range are from 1 PSIA to 55 PSIA, 5 PSIA to 45 PSIA, 5 PSIA to 25 PSIA, 5 PSIA to 15 PSIA, 5 PSIA to 10 PSIA, 10 PSIA to 55 PSIA, 10 PSIA to 25 PSIA, 10 PSIA to 35 PSIA, 15 PSIA to 55 PSIA, 15 PSIA to 40 PSIA, and 15 PSIA to 25 PSIA. In one aspect, the method further comprises the step of heating the chamber to a temperature in a range of 25° C. to 325° C., and the fluoropolymer material is exposed to the fluorination gas at a chamber pressure range from 5 PSIA to 55 PSIA.

One skilled in the art recognizes that the amount of fluorine exposed to the fluoropolymer material should meet the stoichiometric requirements for the reactions of fluorine with the perfluorinated compounds with a suitable excess of fluorine for increased reaction rates. In one aspect, the amount of fluorine exposed to the fluoropolymer material ranges from 0.1 pounds of fluorine per 1000 pounds of fluoropolymer material to 20.0 pounds of fluorine per 1000 pounds of the fluoropolymer material. Other non-limiting examples of the amount of fluorine exposed to the fluoropolymer material ranges from 0.1 pounds of fluorine per 1000 pounds of fluoropolymer material to 10.0 pounds of fluorine per 1000 pounds of the fluoropolymer material; 0.1 pounds of fluorine per 1000 pounds of fluoropolymer material to 5.0 pounds of fluorine per 1000 pounds; 0.1 pounds of fluorine per 1000 pounds of fluoropolymer material to 2.5 pounds of fluorine per 1000 pounds; 0.1 pounds of fluorine per 1000 pounds of fluoropolymer material to 1.0 pounds of fluorine per 1000 pounds; and 0.5 pounds of fluorine per 1000 pounds of fluoropolymer material to 5.0 pounds of fluorine per 1000 pounds. The ranges described above apply to the amount of fluorine equivalents exposed to the fluoropolymer material as well as fluorine.

In one aspect, the method is run in a continuous, semi-continuous, or batch mode of operation. In one aspect, the method is run in a continuous mode of operation. In one aspect, the method is run in a semi-continuous mode of operation. In one aspect, the method is run in a batch mode of operation. The term "continuous" as used herein means a method wherein reactants are introduced, and products withdrawn simultaneously in an uninterrupted manner. By "continuous" it is meant that the method is substantially or completely continuous in operation and is to be contrasted with a "batch" mode of operation. "Continuous" is not meant in any way to prohibit normal interruptions in the continuity of the process due to, for example, start-up, maintenance, or scheduled shut down periods. The term "batch" mode of operation as used herein means a method wherein all the reactants are added to the chamber and then processed according to a predetermined course of reaction during which no material is fed into or removed from the chamber. The term "semi-continuous" mode of operation means a method where some of the reactants are charged at the beginning of the process and the remaining reactants are fed continuously as the reaction progresses. Alternatively, a semi-continuous method may also include a method similar to a batch method in which all the reactants are added at the beginning of the method except that one or more of the products are removed continuously as the reaction progresses. In a non-limiting example, the method is run in a continuous mode of operation when fluoropolymer material and fluorination gas are continuously fed to the chamber, and processed fluoropolymer material and fluorination gas (with slightly less fluorine due to fluorine reacting with perfluorinated compounds) are continuously withdrawn from the chamber. A non-limiting example of a semi-continuous mode of operation is one wherein the fluoropolymer is fed to the chamber, then the fluorination gas is continuously fed and withdrawn from the chamber, and when a sufficient amount of the perfluorinated compounds are removed, the processed fluoropolymer material is withdrawn from the chamber.

In one aspect, providing the fluorination gas of step (c) includes providing a continuous flow of the fluorination gas into the chamber. In one aspect, providing the fluorination gas of step (c) includes providing a continuous flow of the fluorination gas into and/or out of the chamber. One skilled in the art recognizes the advantageous use of a fluorination gas recycle loop, recirculating the fluorination gas exiting the chamber back into the chamber.

According to another exemplary embodiment of the invention, a method of removing perfluorinated compounds in a fluoropolymer material is provided. The method includes the steps of: (a) providing a fluoropolymer material in a chamber; (b) providing an anaerobic environment in the chamber; (c) providing a fluorination gas in the chamber after step (b), thereby exposing the fluoropolymer material to the fluorination gas to produce a processed fluoropolymer material; (d) withdrawing the fluorination gas from the chamber; and (e) withdrawing the processed fluoropolymer from the chamber. The fluorination gas is continuously fed to the chamber during step (c). An amount of the perfluorinated compounds in the processed fluoropolymer material is less than 10 ppb.

It is to be understood that the various aspects of the fluoropolymer material, the chamber, the anaerobic environment in the chamber, the fluorination gas, providing and withdrawing the fluorination gas, providing and withdrawing the fluoropolymer material, the step of heating the chamber and the chamber temperature, the time period wherein the fluoropolymer material is exposed to the fluorination gas, the chamber pressure, the amount of fluorine exposed to the fluoropolymer material, and the mode of operation described herein above apply to the present embodiment as well.

In one aspect the amount of the perfluorinated compounds in the processed fluoropolymer material is less than 100 ppt of the perfluorinated compounds.

In one aspect, the method of the present embodiment further comprises a step of heating the chamber to a temperature in a range of 50° C. to 250° C. and exposing the fluoropolymer material to the fluorination gas for a time period in a range of 1 hour to 48 hours. In one aspect, the fluoropolymer material is a recycled fluoropolymer material, and the perfluorinated compounds removed from the fluoropolymer material comprise perfluorooctanoic acid.

According to another exemplary embodiment of the invention, a method of removing perfluorinated compounds in a fluoropolymer material is provided. The method includes the steps of: (a) feeding fluoropolymer material to a chamber; (b) providing a fluorination gas in the chamber thereby exposing the fluoropolymer material to the gas to produce a processed fluoropolymer material; and (c) withdrawing at least a portion of the processed fluoropolymer material from the chamber. The fluorination gas comprises less than 100 ppm free oxygen, and an amount of the perfluorinated compounds in the processed fluoropolymer material is lower than an amount of the perfluorinated compounds in the fluoropolymer material.

It is to be understood that the various aspects of the fluoropolymer material, the chamber, the anaerobic environment in the chamber, the fluorination gas, providing and withdrawing the fluorination gas, providing and withdrawing the fluoropolymer material, the step of heating the chamber and the chamber temperature, the time period wherein the fluoropolymer material is exposed to the fluorination gas, the chamber pressure, the amount of fluorine exposed to the fluoropolymer material, and the mode of operation described herein above apply to the present embodiment as well.

In one aspect, step (c) of the present embodiment comprises: (1) simultaneously withdrawing a portion of the processed fluoropolymer material and the fluorination gas from the chamber; (2) separating the processed fluoropolymer material from the fluorination gas, forming an effluent fluorination gas; and (3) optionally, recycling at least a portion of the effluent fluorination gas to the chamber. In another aspect, at least a portion of the processed fluoropolymer material withdrawn from the chamber is essentially free of the fluorine in the fluorination gas. In a non-limiting example, a nitrogen purge is used to keep the fluorination gas from exiting the chamber with the processed fluoropolymer material.

In one aspect, the method is run in a continuous, semi-continuous, or batch mode of operation. In one aspect, the method is run in a continuous mode of operation. In one aspect, the method is run in a semi-continuous mode of operation. In one aspect, the method is run in a batch mode of operation. In one aspect, the fluorination gas is provided to the chamber by continuously feeding the fluorination gas to the bottom of the chamber, withdrawing the fluorination gas from the top of the chamber, and recycling the fluorination gas to the bottom of the chamber. In one aspect, the fluoropolymer material comprises pellets and/or powders and the chamber operates as a fluidized bed reactor.

In one aspect, the method of the present embodiment further comprises the step of heating the chamber to a temperature in a range of 25° C. to 325° C., and the fluoropolymer material is exposed to the fluorination gas at a chamber pressure in a range of 5 PSIA to 55 PSIA.

In one aspect, an average residence time for the fluoropolymer in the chamber is in a range of 1 hour to 1000 hours. In one aspect, an average residence time for the fluoropolymer in the chamber is in a range of 1 hour to 48 hours.

In one aspect, the fluorination gas comprises 1 vol % to 100 vol % fluorine. In one aspect, the fluorination gas comprises 99 vol % to 0 vol % of an inert gas, wherein the inert gas comprises nitrogen. In one aspect, the amount of the fluorine exposed to the fluoropolymer material ranges from 0.1 pounds of fluorine per 1000 pounds of fluoropolymer material to 20.0 pounds of fluorine per 1000 pounds of the fluoropolymer material.

In one aspect, the fluoropolymer material is a virgin fluoropolymer material. In one aspect, the fluoropolymer material is a recycled fluoropolymer material.

In one aspect, the processed fluoropolymer material comprises less than 100 ppb perfluorinated compounds. In one aspect, the processed fluoropolymer material comprises less than 100 ppt perfluorinated compounds. In one aspect, the perfluorinated compounds removed from the fluoropolymer material comprise perfluorooctanoic acid.

According to another exemplary embodiment of the invention, a method of removing perfluorinated compounds in a fluoropolymer material is provided. The method includes the steps of: (a) feeding fluoropolymer material to a chamber; (b) providing a fluorination gas in the chamber thereby exposing the fluoropolymer material to the gas to produce processed fluoropolymer material; and (c) withdrawing at least a portion of the processed fluoropolymer material from the chamber. The fluorination gas is provided to the chamber by continuously feeding the fluorination gas to the bottom of the chamber, withdrawing the fluorination gas from the top of the chamber, and recycling the fluorination gas to the bottom of the chamber. The fluorination gas comprises less than 100 ppm free oxygen, and an amount of the perfluorinated compounds in the processed fluoropolymer material is less than 10 ppb.

It is to be understood that the various aspects of the fluoropolymer material, the chamber, the anaerobic environment in the chamber, the fluorination gas, providing and withdrawing the fluorination gas, providing and withdrawing the fluoropolymer material, the step of heating the chamber and the chamber temperature, the time period wherein the fluoropolymer material is exposed to the fluorination gas, the chamber pressure, the amount of fluorine exposed to the fluoropolymer material, and the mode of operation described herein above apply to the present embodiment as well.

In one aspect, the method of the present embodiment further comprises a step of heating the chamber to a temperature in a range of 50° C. to 200° C., and an average residence time for the fluoropolymer material in the chamber is in a range of 1 hour to 48 hours.

In one aspect, the fluoropolymer material is a recycled fluoropolymer material, and the perfluorinated compounds removed from the fluoropolymer material comprise perfluorooctanoic acid.

In one aspect, the fluorination gas comprises 1 vol % to 100 vol % fluorine, and an amount of the fluorine exposed to the fluoropolymer material ranges from 0.1 pounds of fluorine per 1000 pounds of fluoropolymer material to 5.0 pounds of fluorine per 1000 pounds of the fluoropolymer material.

In one aspect, the fluoropolymer material is a recycled fluoropolymer material, and the processed fluoropolymer material comprises less than 100 ppt perfluorinated compounds.

In one aspect, the method is run in a continuous, semi-continuous, or batch mode of operation. In one aspect, the method is run in a continuous mode of operation. In one aspect, the method is run in a semi-continuous mode of operation. In one aspect, the method is run in a batch mode of operation.

According to another exemplary embodiment of the invention, a system for removing perfluorinated compounds in a fluoropolymer material is provided. The system includes a chamber for housing the fluoropolymer material. The chamber is provided with an anaerobic environment during at least a portion of a processing cycle. The system includes a fluorination gas source for fluorinating the chamber during at least a portion of the processing cycle. The system also includes a control system for controlling flow of the fluorination gas entering and/or leaving the chamber. At least a portion of the perfluorinated compounds are removed from the fluoropolymer material.

It is to be understood that the various aspects of the fluoropolymer material, the chamber, the anaerobic environment in the chamber, the fluorination gas, providing and withdrawing the fluorination gas, providing and withdrawing the fluoropolymer material, the step of heating the chamber and the chamber temperature, the time period wherein the fluoropolymer material is exposed to the fluorination gas, the chamber pressure, the amount of fluorine exposed to the fluoropolymer material, and the mode of operation described herein above apply to the present embodiment as well.

For example, in one aspect the system for removing perfluorinated compounds further comprises a heater, whereby the control system further controls the temperature of the chamber during at least a portion of the processing cycle. In one aspect, the control system controls the temperature of the chamber in a range of 25° C. to 300° C. In one aspect, the control system further controls the pressure of the chamber during at least a portion of the processing cycle. In one aspect the control system controls the pressure of the chamber within a range of 5 PSIA to 55 PSIA.

In one aspect, the fluorination gas comprises 1 vol % to 99 vol % fluorine and 99 vol % to 1 vol % nitrogen. In one aspect, the amount of fluorine exposed to the fluoropolymer material ranges from 0.1 pounds fluorine per 1000 pounds of fluoropolymer material to 20.0 pounds fluorine per 1000 pounds of the fluoropolymer material. In one aspect, the control system controls the amount of fluorine exposed to the fluoropolymer material by manipulating the flow rate of the fluorination gas.

In one aspect, the fluoropolymer material is in a bulk material form. In one aspect, the chamber comprises a fluidized bed, and the bulk material form comprises pellets and/or powder. In one aspect, the fluoropolymer material is part of a workpiece. In one aspect, the fluoropolymer material is a virgin fluoropolymer material. In one aspect, the fluoropolymer material is a recycled fluoropolymer material.

In one aspect, the perfluorinated compounds are removed from the fluoropolymer material to a concentration of less than 100 ppb. In one aspect, the perfluorinated compounds are removed from the fluoropolymer material to a concentration of less than 100 ppt. In one aspect, the perfluorinated compounds removed from the fluoropolymer material comprise perfluorooctanoic acid.

In one aspect, the system further comprises a heater, whereby the control system further controls the temperature of the chamber in a range of 25° C. to 300° C. during at least a portion of the processing cycle, and the perfluorinated compounds are removed from the fluoropolymer material to a concentration of less than 100 ppb.

According to yet another exemplary embodiment of the invention, a system for removing perfluorinated compounds in a fluoropolymer material is provided. The system includes a chamber for housing the fluoropolymer material. The chamber is provided with an anaerobic environment during at least a portion of a processing cycle. The system includes a fluorination gas source for fluorinating the chamber during at least a portion of the processing cycle. The system also includes a control system for controlling flow of the fluorination gas entering and/or leaving the chamber. At least a portion of the perfluorinated compounds are removed from the fluoropolymer material to a concentration of less than 10 ppb.

It is to be understood that the various aspects of the fluoropolymer material, the chamber, the anaerobic environment in the chamber, the fluorination gas, providing and withdrawing the fluorination gas, providing and withdrawing the fluoropolymer material, the step of heating the chamber and the chamber temperature, the time period wherein the fluoropolymer material is exposed to the fluorination gas, the chamber pressure, the amount of fluorine exposed to the fluoropolymer material, and the mode of operation described herein above apply to the present embodiment as well.

In one aspect, the system further comprises a heater, whereby the control system further controls the temperature of the chamber during at least a portion of the processing cycle within a range of 25° C. to 325° C., and the control system further controls the pressure of the chamber during at least a portion of the processing cycle within a range of 5 PSIA to 55 PSIA.

In one aspect, the fluoropolymer material is provided to the chamber in a bulk material form. In one aspect, the fluoropolymer material is provided to the chamber as part of a workpiece. In one aspect, the perfluorinated compounds removed from the fluoropolymer material comprise perfluorooctanoic acid.

FIG. 1A is a block diagram illustrating a system 100a for processing fluoropolymer material, to remove perfluorinated compounds from the fluoropolymer material. In FIG. 1A, the fluoropolymer material is illustrated as bulk fluoropolymer material 104a (e.g., pellets, a powder, shredded material, sheet material, film material, string, etc.). System 100a includes a chamber 102a configured to receive bulk fluoropolymer material 104a. System 100a also includes a control system 106a (e.g., using software installed on, and/or accessible by, a computer element of control system 106a) configured to control the environment within chamber 102a to fluorinate bulk fluoropolymer material 104a within chamber 102a. Control system 106a works with a gas withdrawal system 108a, and a fluorination gas supply system 110a. Specifically, gas withdrawal system 108a may be used (as controlled by control system 106a, and with piping 108a1) to prepare chamber 102a to have an anaerobic environment (e.g., by withdrawing air from chamber 102a, by creating a full/partial vacuum environment in chamber 102a, etc.). Likewise, fluorination gas supply system 110a may be used (as controlled by control system 106a, and with piping 110a1) to purge chamber 102a (e.g., with nitrogen), and/or to fluorinate the bulk fluoropolymer material 104a by having a controlled environment using fluorination gas (e.g., pure fluorine gas, a mixture of fluorine and another gas such as nitrogen, etc.). System 100a also includes heater 112a (e.g., controlled by control system 106a) for heating chamber 102a during fluorination of the bulk fluoropolymer material 104a to a desired temperature (e.g., a temperature in a range of between 25° C.-325° C.).

Figure 1B:
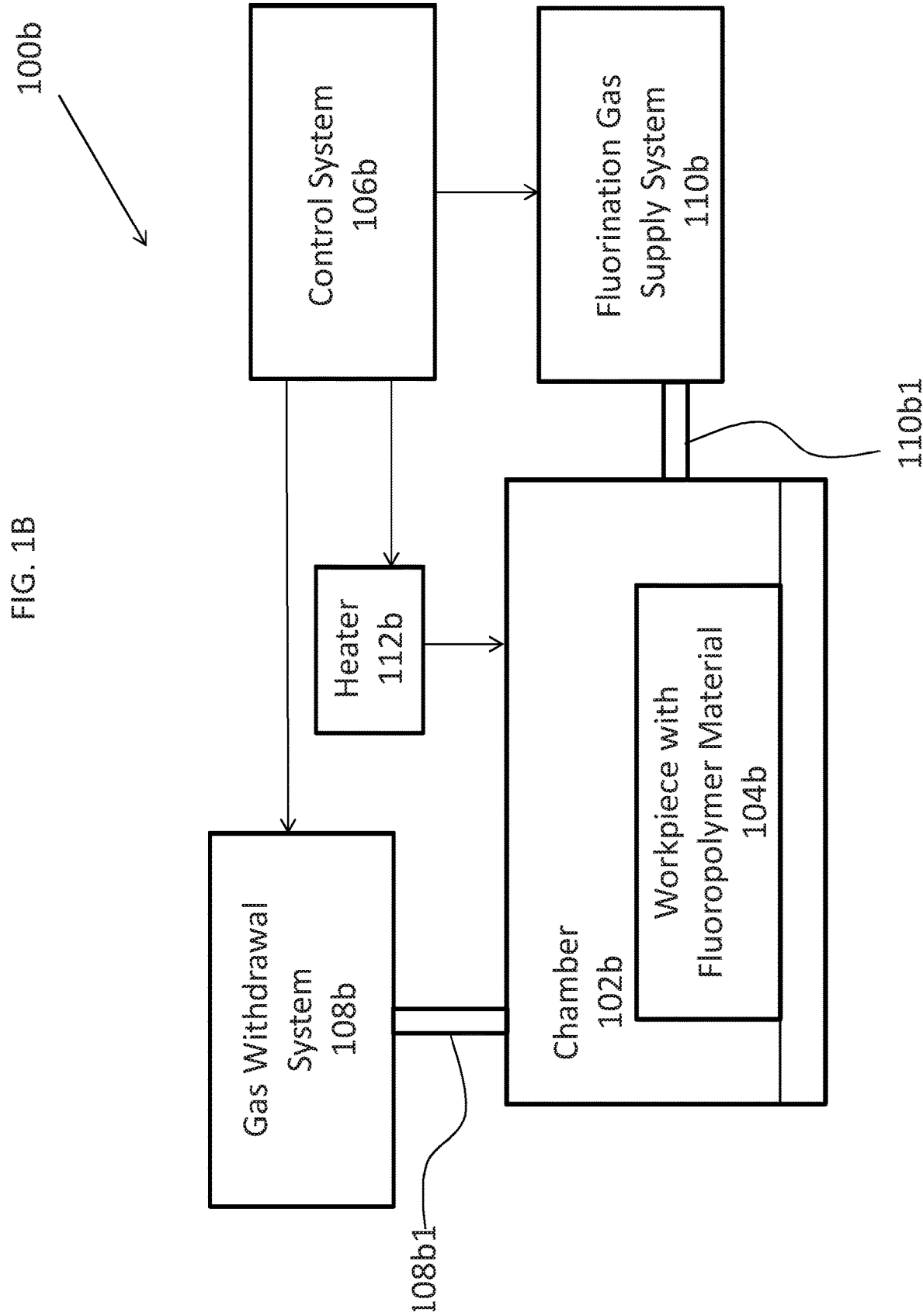

FIG. 1B is a block diagram illustrating a system 100b for processing fluoropolymer material, to remove perfluorinated compounds from the fluoropolymer material. In FIG. 1B, the fluoropolymer material is illustrated as a workpiece 104b including a fluoropolymer material (e.g., a workpiece including a fluoropolymer coating, etc.). System 100b includes a chamber 102b configured to receive workpiece 104b. System 100b also includes a control system 106b (e.g., using software installed on, and/or accessible by, a computer element of control system 106b) configured to control the environment within chamber 102b to fluorinate the fluoropolymer material included with workpiece 104b in chamber 102b. Control system 106b works with a gas withdrawal system 108b, and a fluorination gas supply system 110b. Specifically, gas withdrawal system 108b may be used (as controlled by control system 106b, and with piping 108b1) to prepare chamber 102b to have an anaerobic environment (e.g., by withdrawing air from chamber 102b, by creating a full/partial vacuum environment in chamber 102b, etc.). Likewise, fluorination gas supply system 110b may be used (as controlled by control system 106b, and with piping 110b1) to purge chamber 102b (e.g., with nitrogen), and/or to fluorinate workpiece 104b by having a controlled environment using fluorination gas (e.g., pure fluorine gas, a mixture of fluorine and another gas such as nitrogen, etc.). System 100b also includes heater 112b (e.g., controlled by control system 106b) for heating chamber 102b during fluorination of workpiece 104b to a desired temperature (e.g., a temperature in a range of between 25° C.-325° C.). Although FIG. 1B illustrates a single workpiece 104b in chamber 102b, it is understood that a plurality of workpieces 104b may be included in chamber 102b for processing in a single operation.

Figure 1C:
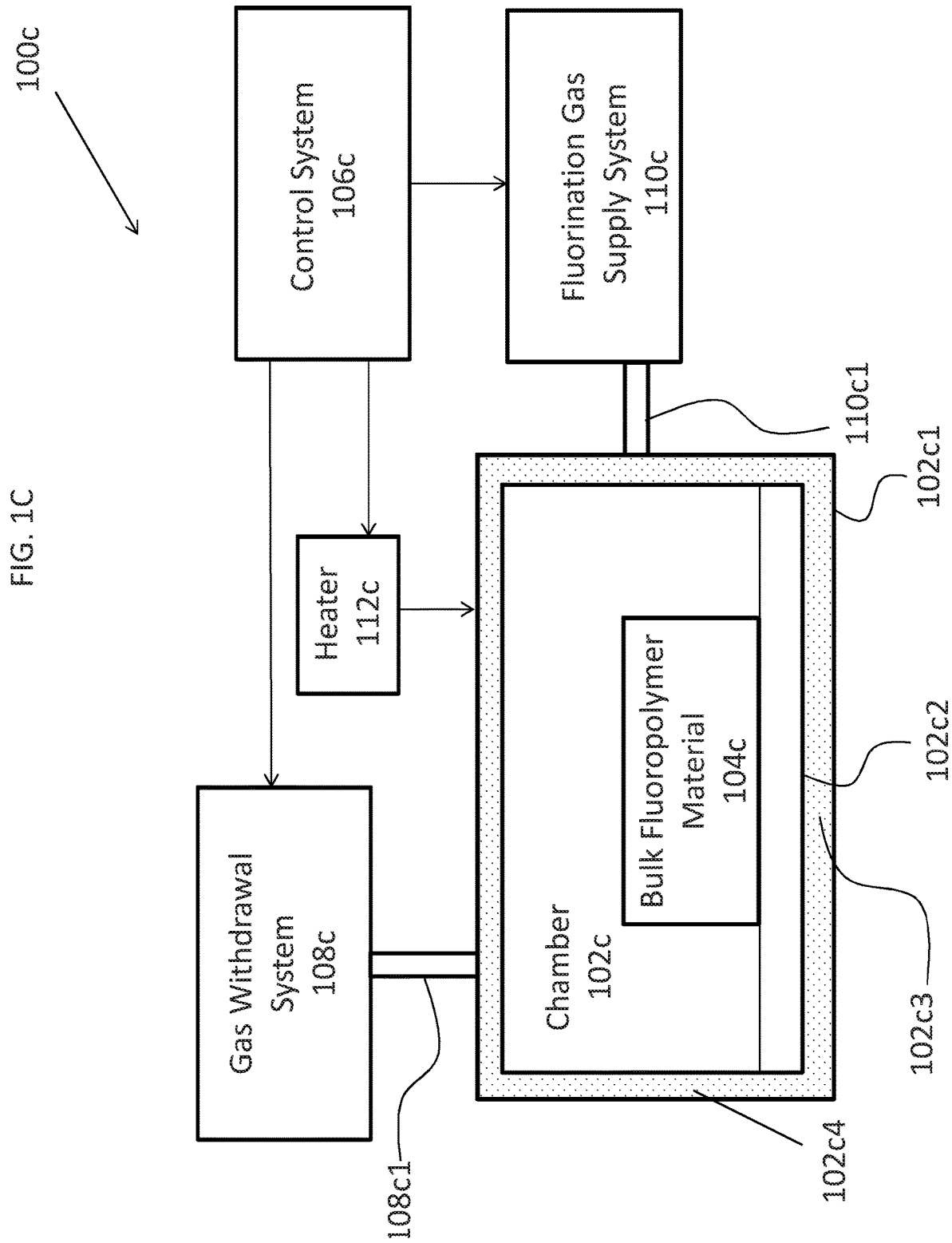

FIG. 1C is a block diagram illustrating a system 100c for processing fluoropolymer material, to remove perfluorinated compounds from the fluoropolymer material. In FIG. 1C, the fluoropolymer material is illustrated as bulk fluoropolymer material 104c (e.g., pellets, a powder, shredded material, sheet material, film material, string, etc.). System 100c includes a chamber 102c configured to receive bulk fluoropolymer material 104c. System 100c also includes a control system 106c (e.g., using software installed on, and/or accessible by, a computer element of control system 106c) configured to control the environment within chamber 102c to fluorinate bulk fluoropolymer material 104c within chamber 102c. Control system 106c works with a gas withdrawal system 108c, and a fluorination gas supply system 110c. Specifically, gas withdrawal system 108c may be used (as controlled by control system 106c, and with piping 108c1) to prepare chamber 102c to have an anaerobic environment (e.g., by withdrawing air from chamber 102c, by creating a full/partial vacuum environment in chamber 102c, etc.). Likewise, fluorination gas supply system 110c may be used (as controlled by control system 106c, and with piping 110c1) to purge chamber 102c (e.g., with nitrogen), and/or to fluorinate the bulk fluoropolymer material 104c by having a controlled environment using fluorination gas (e.g., pure fluorine gas, a mixture of fluorine and another gas such as nitrogen, etc.). System 100c also includes heater 112c (e.g., controlled by control system 106c) for heating chamber 102c during fluorination of the bulk fluoropolymer material 104c to a desired temperature (e.g., a temperature in a range of between 25° C.-325° C.). In FIG. 1C, chamber 102c includes an outer wall 102c1 and an inner wall 102c2, with a space 102c3 therebetween. A fluid 102c4 (e.g., oil or other heatable fluid) is provided in space 102c3. Bulk fluoropolymer material 104c is provided in chamber 102c, within inner wall 102c2. Heater 112c heats chamber 102c by heating 102c4 to the desired temperature for processing bulk fluoropolymer material 104c to remove the perfluorinated compounds from bulk fluoropolymer material 104c.

Figure 1D:
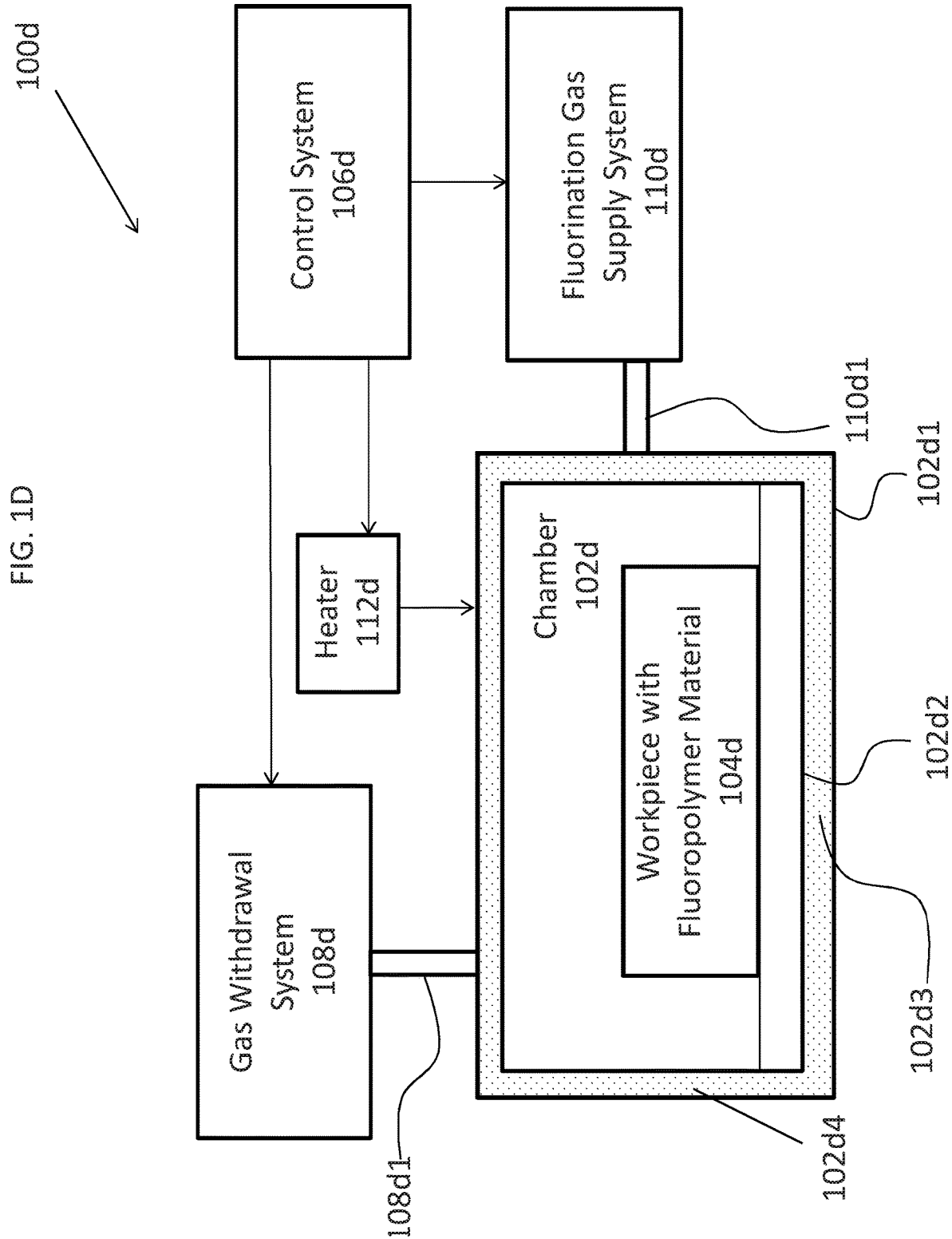

FIG. 1D is a block diagram illustrating a system 100d for processing fluoropolymer material, to remove perfluorinated compounds from the fluoropolymer material. In FIG. 1D, the fluoropolymer material is illustrated as a workpiece 104d including a fluoropolymer material (e.g., a workpiece including a fluoropolymer coating, etc.). System 100d includes a chamber 102d configured to receive workpiece 104d. System 100d also includes a control system 106d (e.g., using software installed on, and/or accessible by, a computer element of control system 106d) configured to control the environment within chamber 102d to fluorinate the fluoropolymer material included with workpiece 104d in chamber 102d. Control system 106d works with a gas withdrawal system 108d, and a fluorination gas supply system 110d. Specifically, gas withdrawal system 108d may be used (as controlled by control system 106d, and with piping 108d1) to prepare chamber 102d to have an anaerobic environment (e.g., by withdrawing air from chamber 102d, by creating a full/partial vacuum environment in chamber 102d, etc.). Likewise, fluorination gas supply system 110d may be used (as controlled by control system 106d, and with piping 110d1) to purge chamber 102d (e.g., with nitrogen), and/or to fluorinate workpiece 104d by having a controlled environment using fluorination gas (e.g., pure fluorine gas, a mixture of fluorine and another gas such as nitrogen, etc.). System 100d also includes heater 112d (e.g., controlled by control system 106d) for heating chamber 102d during fluorination of workpiece 104d to a desired temperature (e.g., a temperature in a range of between 25-325° C.). Although FIG. 1D illustrates a single workpiece 104d in chamber 102d, it is understood that a plurality of workpieces 104d may be included in chamber 102d for processing in a single operation. In FIG. 1D, chamber 102d includes an outer wall 102d1 and an inner wall 102d2, with a space 102d3 therebetween. A fluid 102d4 (e.g., oil or other heatable fluid) is provided in space 102d3. Workpiece 104d is provided in chamber 102d, within inner wall 102d2. Heater 112d heats chamber 102d by heating fluid 102d4 according to a desired temperature for processing workpiece 104d to remove the perfluorinated compounds from the fluoropolymer material included with workpiece 104d.

FIGS. 1A-1D illustrates heating operation of chambers 102a, 102b, 102c, 102d using respective heaters 112a, 112b, 112c, 112d. The operation of heaters 112a, 112b, 112c, 112d may be controlled to provide a given temperature for processing the specific fluoropolymer (e.g., bulk fluoropolymer material 104a or workpiece 104b) to remove the perfluorinated compounds from the fluoropolymer material. The heater may be controlled for a constant temperature in respective chamber 102a, 102b, 112c, 112d during the fluorination process; however, a temperature profile (with the temperature in the chamber being controlled according to the profile during different portions of the fluorination process) may be utilized.

While FIGS. 1A-1D, illustrate a single control system 106a, 106b, 106c, 106d configured to operate the respective gas withdrawal system, fluorination gas supply system, and heater, it is understood that multiple control systems (e.g., programmable control systems such as programmable logic controllers, computer controlled systems, etc.) may be utilized to control the respective gas withdrawal system, fluorination gas supply system, and heater.

While FIGS. 1A-1D illustrate distinct gas withdrawal systems (systems 108a, 108b, 108c, and 108d), and distinct fluorination gas supply systems (systems 110a, 110b, 110c, and 110d), it will be understood by those skilled in the art that such systems (e.g., systems 108a and 110a from FIG. 1A) may be combined in certain applications to save on cost/efficiency.

Figure 2A:
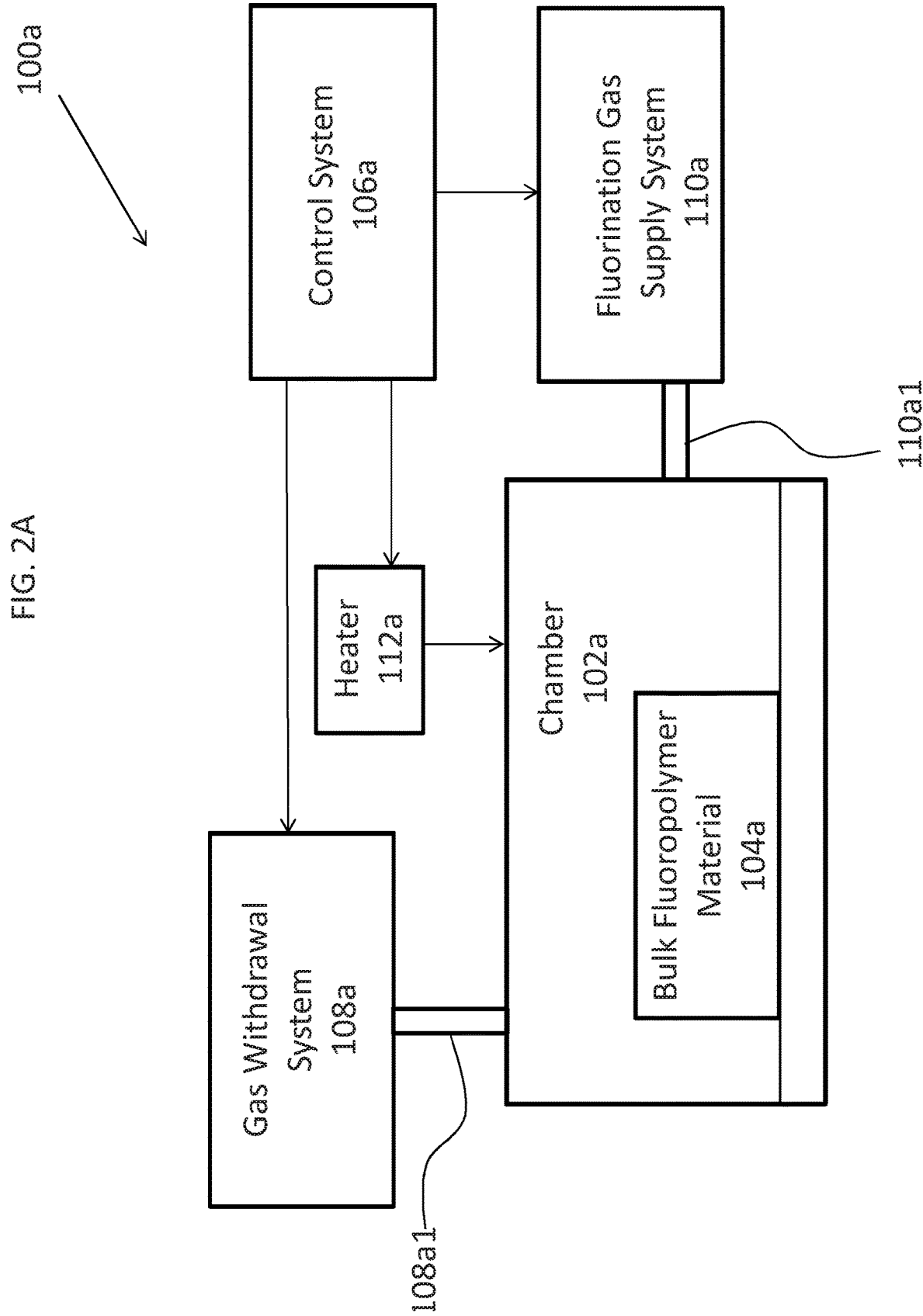
FIGS. 2A-2D are a sequence of block diagrams of a system for processing a fluoropolymer material to remove a perfluorinated compounds from the fluoropolymer material, in accordance with an exemplary embodiment of the invention.
Figure 2B:
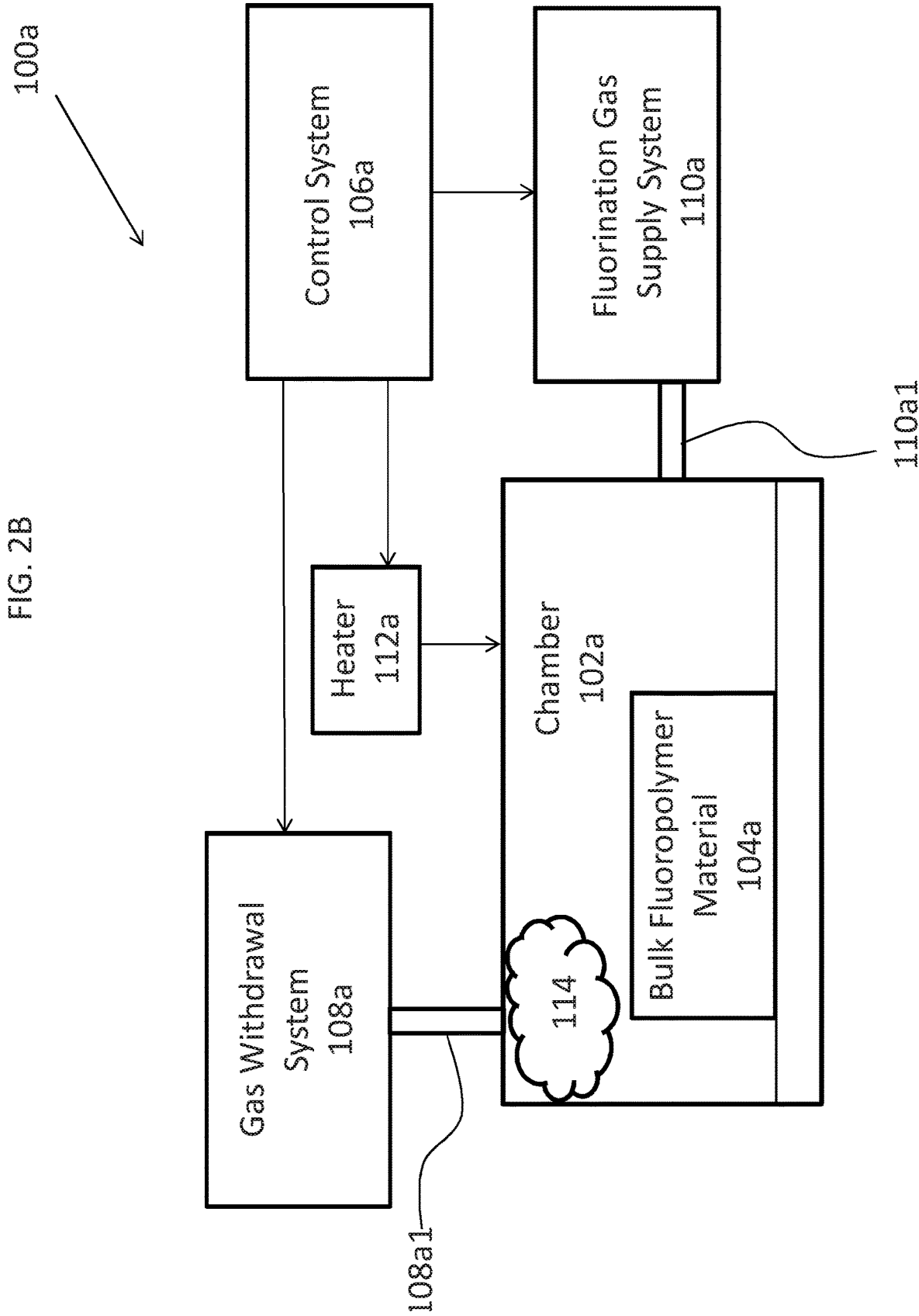

FIGS. 2A-2D are a sequence of block diagrams of a system 100a for processing bulk fluoropolymer material 104a to remove perfluorinated compounds from the bulk fluoropolymer material 104a. FIG. 2A illustrates system 100a from FIG. 1A, with bulk fluoropolymer material 104a provided in chamber 102a. At FIG. 2B, chamber 102a is prepared to have an anaerobic environment, for example, by withdrawing oxygen 114 from chamber 102a using gas withdrawal system 108a (as controlled by control system 106a). Specifically, gas withdrawal system 108a may include a pump, motor, or other equipment, used in conjunction with piping 108a1, to withdraw oxygen 114 from chamber 102a. In other examples, gas withdrawal system 108a may be used to draw a vacuum (e.g., a full vacuum, a partial vacuum, etc.) to prepare chamber 102a to have an anaerobic environment. At FIG. 2C, bulk fluoropolymer material 104a is fluorinated in chamber 102a using a fluorination gas 116. Specifically, fluorination gas supply system 110a is used (as controlled by control system 106a) to pump or otherwise direct fluorination gas 116 into chamber 102a. Fluorination gas 116 may be, for example: pure fluorine gas; fluorine gas mixed with an inert gas (e.g., nitrogen, carbon dioxide, argon, etc.); etc. By providing fluorination gas 116 into chamber 102a, bulk fluoropolymer material 104a is fluorinated sufficiently to remove a desired amount of the perfluorinated compounds from bulk fluoropolymer material 104a. At FIG. 2D, gas withdrawal system 108a (as controlled by control system 106a) is used to withdraw modified fluorination gas 116a from chamber 102a. That is, as will be appreciated by those skilled in the art, the fluorination gas (originally referred to as fluorination gas 116) is modified in chamber 102a, due to its reaction with bulk fluoropolymer material 104a during the fluorination process. Thus, in FIG. 1D, a modified fluorination gas 116a is removed from chamber 102a. As shown in FIG. 1D, bulk fluoropolymer material is now identified with reference numeral 104a1 (as opposed to reference numeral 104a) because of the removal of the perfluorinated compounds.

While the process described above in connection with FIGS. 2A-2D is shown with respect to system 100a of FIG. 1A, the same process may be applied to systems 100b (of FIG. 1B), 100c (of FIG. 1C), and 100d (of FIG. 1D), or any other system within the scope of the invention.

FIG. 3 is a flow diagram illustrating a method of processing a fluoropolymer material. As is understood by those skilled in the art, certain steps included in the flow diagram may be omitted; certain additional steps may be added; and the order of the steps may be altered from the order illustrated.

At Step 300, the key process parameters for removing perfluorinated compounds from a fluoropolymer material (e.g., a bulk fluoropolymer material, a workpiece including a fluoropolymer coating, etc.) are input to the control system. Key process parameters may include: (i) a heating profile for use during the fluorination process; (ii) the fluorination gas composition; (iii) a pressure profile for use during the fluorination process; and (iv) timing of the various operations of the fluorination process. For example, and as described above, the control system may call for a constant temperature in the chamber during the fluorination process or may call for the use of a temperature profile (with the temperature in the chamber being controlled according to the profile during different portions of the fluorination process) (e.g., uniform temperature control in the chamber during the fluorination process versus temperature ramping or variable temperature control during the fluorination process).

Figure 2C:
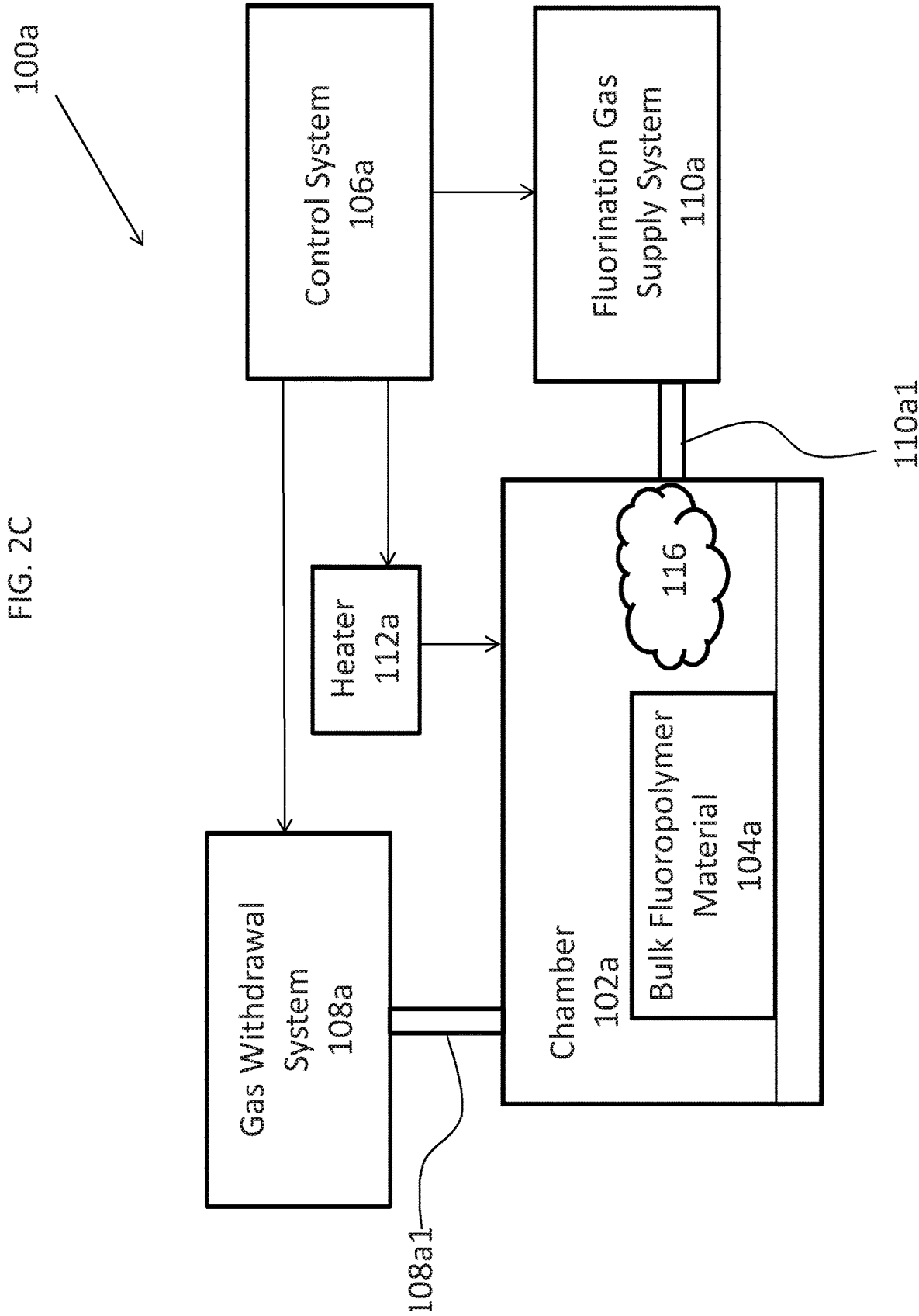
Figure 2D:
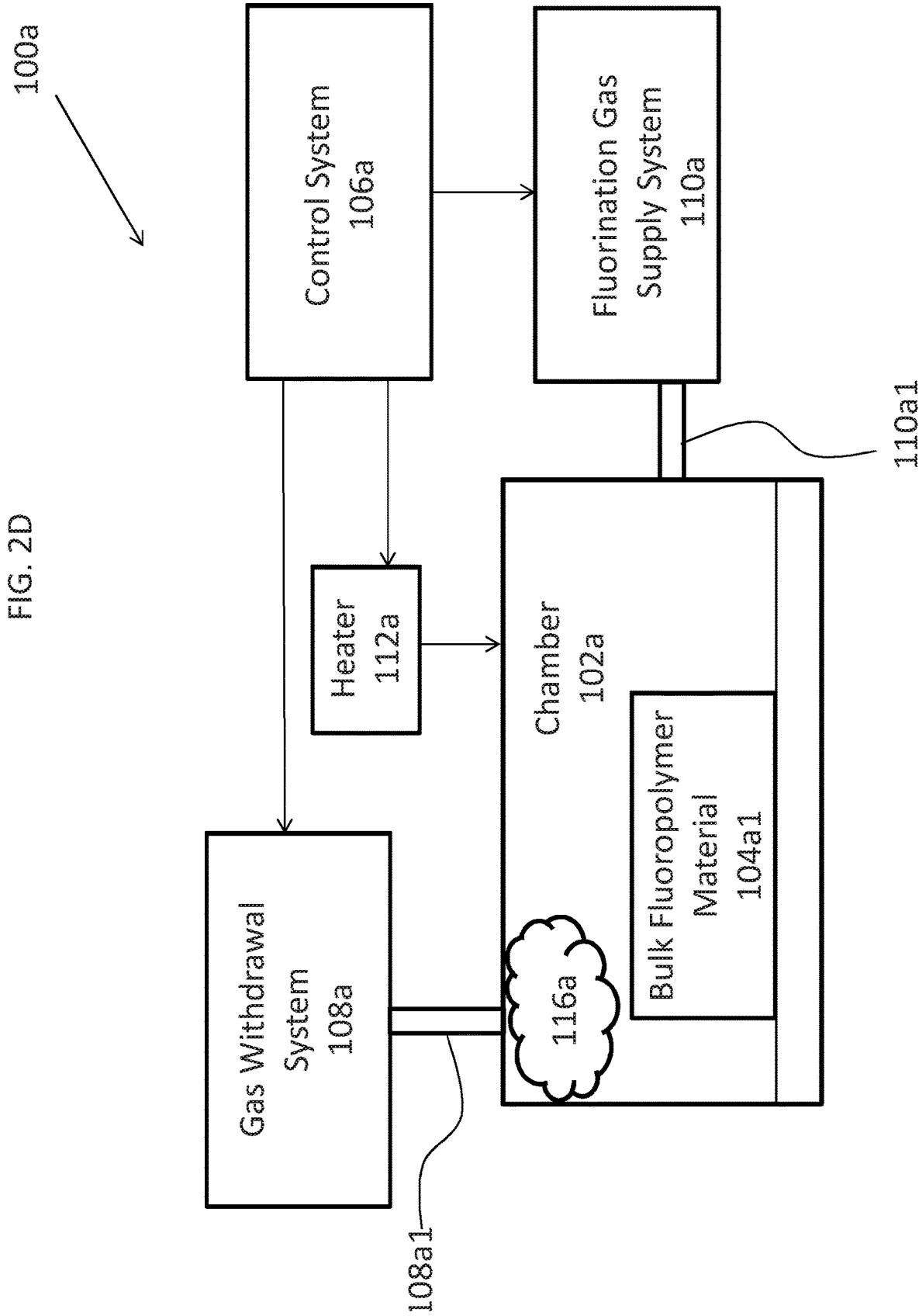

At Step 302, the fluoropolymer material is provided in a chamber (e.g., bulk fluoropolymer material 104a is provided in chamber 102a in FIG. 1A, a workpiece 104b including a fluoropolymer material coating such as in FIG. 1B, etc.). At Step 304, an anaerobic environment is provided in the chamber (e.g., in FIG. 2B, chamber 102a is prepared to have an anaerobic environment, for example, by withdrawing oxygen 114 from chamber 102a and/or purging chamber 102a with nitrogen). At Step 306 (which may be an optional step), the chamber is heated to temperature profile (e.g., a fixed temperature, a variable temperature profile, etc.) of Step 300. At Step 308, the fluoropolymer material is fluorinated after Step 304, thereby removing the perfluorinated compounds from the fluoropolymer material. For example, the fluoropolymer material is fluorinated in the chamber with a fluorination gas (e.g., using fluorination gas supply system 110a controlled by control system 106a, as shown in FIG. 2C) (e.g., where the fluorinating step may be conducted under negative pressure, under positive pressure, under vacuum pressure, under a combination, etc.). After Step 308, the fluorination gas is removed from the chamber (e.g., using gas withdrawal system 108a controlled by control system 106a, as shown in FIG. 2D) (e.g., where the chamber is purged with nitrogen in connection with the removal of the fluorination gas).

EXAMPLES

Fluoropolymers were commercially available and used without any father processing.

Example 1

1 pound PTFE regrind, obtained from CSI Plastic (Millbury, Mass.), was inserted into a chamber. The chamber was heated using annular flow of hot oil at 200° C. for a nominal chamber temperature of 175° C. Oxygen was removed from the chamber using a nitrogen pressure swing inerting method. Gas flow of 20 vol % fluorine and 80% nitrogen was started at 0.4 scfm. The chamber pressure varied between 5 PSIA and 12 PSIA over the course of the experiment. The fluorine gas was fed through the chamber for 4 hours with the direction of gas flow alternated between top to bottom and bottom to top each hour. The amount of fluorine used was 4.99 pounds of fluorine per 1000 pounds of PTFE regrind. At the end of 4 hours, the oil heat was turned off and the chamber was again inerted using a nitrogen pressure swing method. Atmospheric air was fed through the chamber until the chamber temperature dropped below 55° C. The sample was tested for perfluorooctanoic acid (PFOA) and perfluorooctanesulfonic acid (PFOS) using EPA method 3452A and EPA method 8321B. The sample was tested both before and after being treated with fluorine gas. The detection limit for PFOA and PFOS was 100 parts per trillion. No PFOS was detected either before or after the sample was treated. The results are shown in Table 1.

Examples 2-3

Example 1 was repeated with the material listed in Table 1 which was obtained from Reprolon Texas (Burnet, Tex.). The results are shown in Table 1.

TABLE 1

| Example | Description | Beginning PFOA ppb (µg/L) | Ending PFOA ppt (ng/L) |
|---|---|---|---|
| 1 | PTFE regrind | 9.26 | ND[1] |
| 2 | micro powder 1126 - PTFE | 557 | ND |
| 3 | micro powder 1005 - PTFE | 127 | ND |

[1]ND indicates less than 100 parts per trillion.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of removing perfluorinated compounds, the method comprising the steps of:
   (a) providing a fluoropolymer micropowder in a chamber;
   (b) providing an anaerobic environment in the chamber; and
   (c) providing a fluorination gas in the chamber after step (b), thereby exposing the fluoropolymer micropowder to the fluorination gas to produce a processed fluoropolymer micropowder, wherein the fluoropolymer micropowder comprises perfluorinated compounds generated during the process for making the fluoropolymer micropowder, and wherein an amount of the perfluorinated compounds in the processed fluoropolymer micropowder is less that 10 ppb based upon a total amount of the processed fluoropolymer micropowder.

2. The method of claim 1, further comprising the steps of
   (d) withdrawing the fluorination gas from the chamber; and
   (e) withdrawing the processed fluoropolymer micropowder from the chamber.

3. The method of claim 1, further comprising a step of heating the chamber to a temperature in a range of 25° C. to 325° C., and wherein the fluoropolymer micropowder is exposed to the fluorination gas at a chamber pressure in a range of 5 psia to 55 psia.

4. The method of claim 1, wherein the fluoropolymer micropowder is exposed to the fluorination gas for a time period in a range of 1 hour to 1000 hours.

5. The method of claim 1, wherein the fluorination gas comprises 1 vol % to 100 vol % fluorine.

6. The method of claim 5, wherein an amount of the fluorine exposed to the fluoropolymer micropowder ranges from 0.1 pounds of fluorine per 1000 pounds of fluoropolymer micropowder to 20.0 pounds of fluorine per 1000 pounds of the fluoropolymer micropowder.

7. The method of claim 1, wherein the fluorination gas comprises 99 vol % to 0 vol % of an inert gas, wherein the inert gas comprises nitrogen.

8. The method of claim 1, wherein providing the fluorination gas of step (c) includes providing a continuous flow of the fluorination gas into and/or out of the chamber.

9. The method of claim 1, wherein the fluoropolymer micropowder is provided in a bulk material form.

10. The method of claim 1, wherein the fluoropolymer micropowder is provided as part of a workpiece.

11. The method of claim 1, wherein the fluoropolymer micropowder is a virgin fluoropolymer material, prepared from newly manufactured fluoropolymer.

12. The method of claim 1, wherein the fluoropolymer micropowder is a recycled fluoropolymer material, prepared from recycled fluoropolymer that has been reground.

13. The method of claim 1, wherein the processed fluoropolymer micropowder comprises less than 1,000 ppt perfluorinated compounds.

14. The method of claim 1, wherein the processed fluoropolymer micropowder comprises less than 100 ppt perfluorinated compounds.

15. The method of claim 1, wherein the perfluorinated compounds removed from the fluoropolymer micropowder comprise perfluorooctanoic acid.

16. A method for removing perfluorinated compounds, the method comprising the steps of:
   (a) providing a polytetrafluoroethylene (PTFE) micropowder in a chamber;
   (b) providing an anaerobic environment in the chamber;

(c) providing a fluorination gas in the chamber after step (b), thereby exposing the PTFE micropowder to the fluorination gas to produce a processed PTFE micropowder;

(d) withdrawing the fluorination gas from the chamber; and (e) withdrawing the processed PTFE micropowder from the chamber, wherein the PTFE micropowder comprises perfluorinated compounds generated during the process for making PTFE micropowder, and wherein the fluorination gas is continuously fed to the chamber during step (c), and wherein an amount of the perfluorinated compounds in the processed PTFE micropowder is less than 10 ppb.

17. The method of claim 16, further comprising a step of heating the chamber to a temperature in a range of 50° C. to 200° C., and wherein the PTFE micropowder is exposed to the fluorination gas for a time period in a range of 1 hour to 48 hours.

18. The method of claim 16, wherein the PTFE micropowder is a recycled fluoropolymer material, prepared from recycled PTFE that has been reground, and wherein the perfluorinated compounds removed from the PTFE micropowder comprise perfluorooctanoic acid.

19. The method of claim 16, wherein the chamber operates as a fluidized bed.

* * * * *